(No Model.) 2 Sheets—Sheet 1.
J. T. HAYDEN.
CHUCK HAVING REVOLUBLE JAWS.
No. 420,199. Patented Jan. 28, 1890.
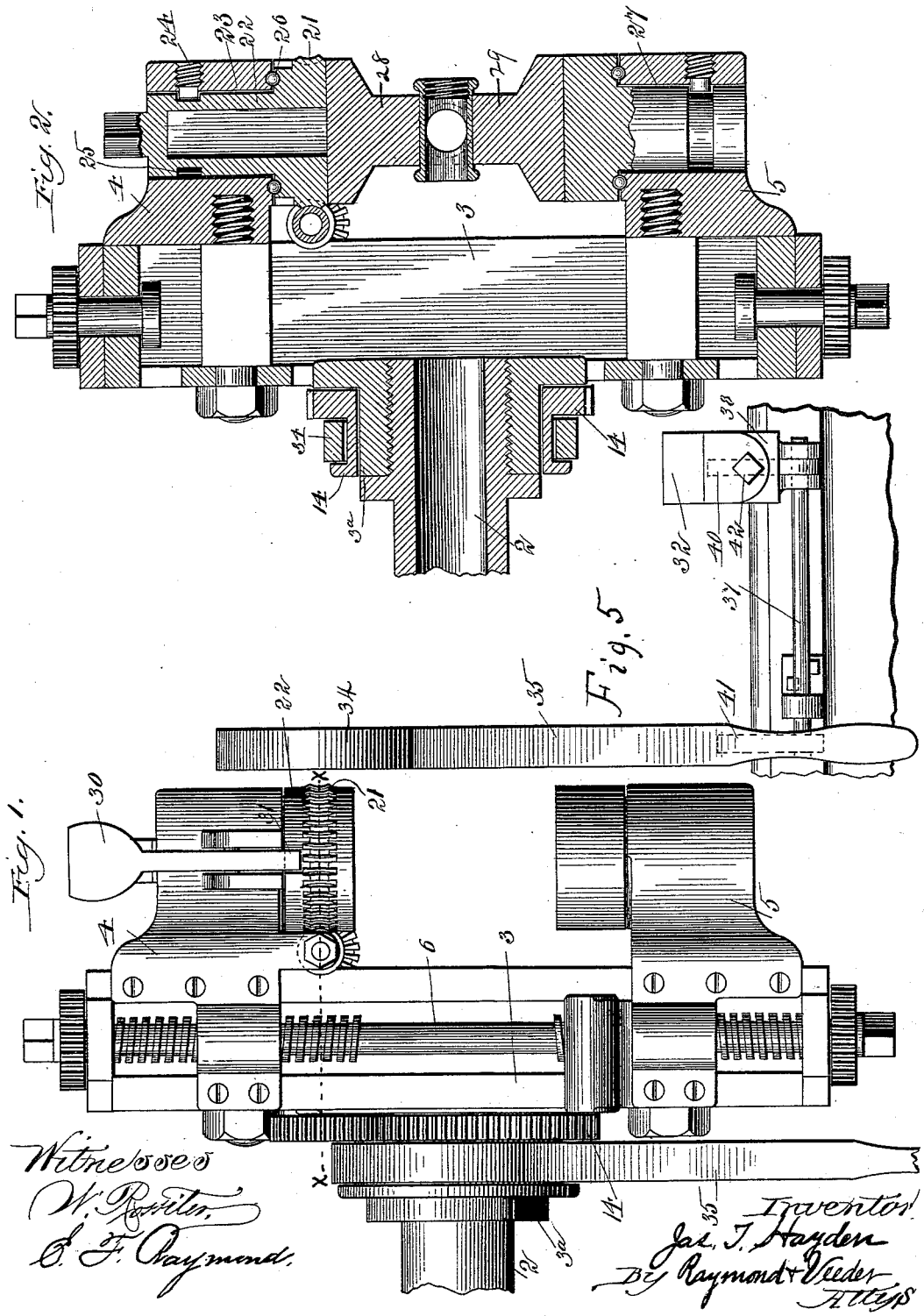

(No Model.) 2 Sheets—Sheet 2.
J. T. HAYDEN.
CHUCK HAVING REVOLUBLE JAWS.
No. 420,199. Patented Jan. 28, 1890.
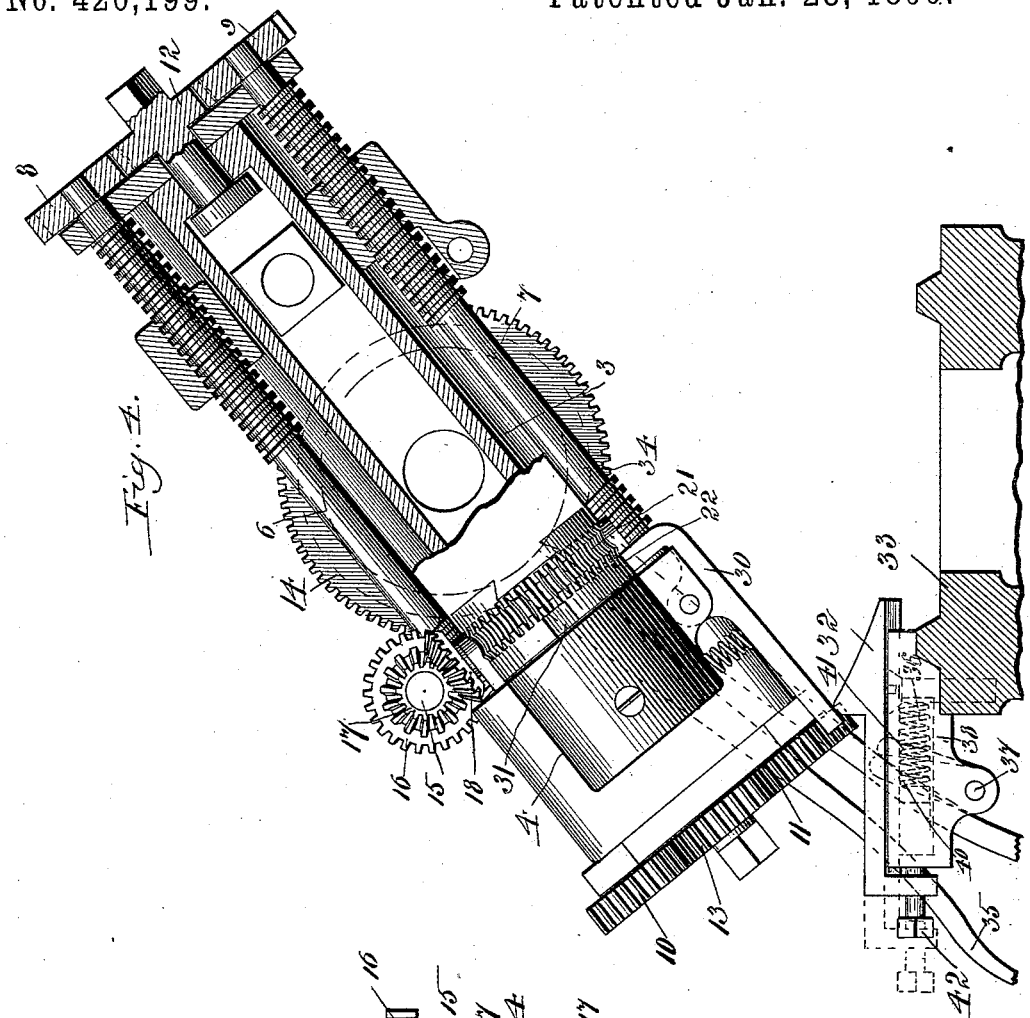
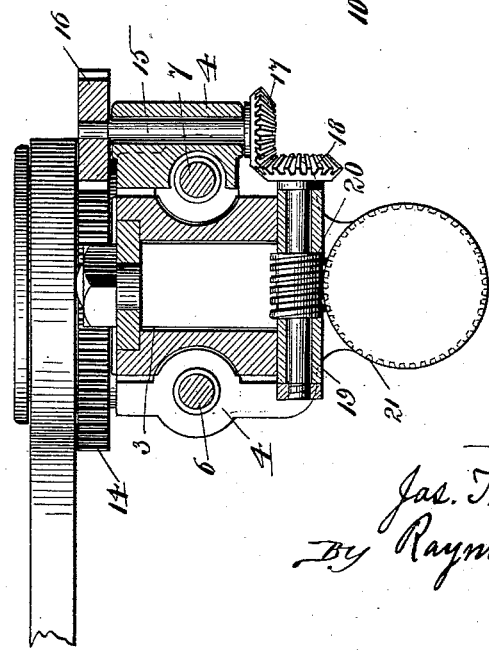
Witnesses
J. Rossiter
D. F. Raymond
Inventor
Jas. T. Hayden
By Raymond & Veeder
Att'ys

UNITED STATES PATENT OFFICE.

JAMES T. HAYDEN, OF CHICAGO, ILLINOIS, ASSIGNOR TO THE CRANE BROTHERS MANUFACTURING COMPANY, OF ILLINOIS.

CHUCK HAVING REVOLUBLE JAWS.

SPECIFICATION forming part of Letters Patent No. 420,199, dated January 28, 1890.

Application filed August 26, 1889. Serial No. 322,008. (No model.)

*To all whom it may concern:*

Be it known that I, JAMES T. HAYDEN, of Chicago, in the county of Cook and State of Illinois, have invented certain new and useful Improvements in Chucks, of which the following is a specification.

My improvements relate to that class of chucks in which the piece held by the chuck may be shifted without releasing it from the chuck-jaws, so as to present successive parts in position for action of the tools.

The main purpose of my invention is to accomplish the shifting of the object chucked in a convenient and expeditious manner without the necessity of stopping the lathe or other tool to which the chuck may be attached.

Another purpose of my invention is to make a convenient and accessible arrangement of the working parts and to leave the central portion of the chuck clear, so as not to interfere with the use of drills, reamers, or other tools.

In the accompanying drawings the chuck is supposed to be attached to a lathe, a portion of the ways and spindle only of the latter being shown, however, to indicate the relation of the chuck thereto.

Figure 1 is a side view of the chuck. Fig. 2 is a central vertical section of Fig. 1. Fig. 3 is a cross-section on line $x\ x$, Fig. 1. Fig. 4 is a front view, partly in section, of the chuck, and shows also a portion of the lathe-bed or ways. Fig. 5 is a view showing details of the tripping device.

2, Figs. 1 and 2, is the end of the lathe-spindle, on which the chuck is screwed in the ordinary way. The body 3 of the chuck is prismatic in form, and jaws 4 5 are fitted to each end so as to be capable of sliding thereon. Two screws 6 and 7, Fig. 3, having right and left threads on their opposite ends, extend across the chuck and are fitted to corresponding nuts in the jaws 4 and 5. Gear-wheels 8 and 9 at one end and 10 and 11 at the other of screws 6 and 7 mesh with the intermediate gears 12 and 13, respectively, at each end of the body 3. By turning either gear 12 or 13 both screws 6 and 7 will be revolved and the jaws 4 and 5 simultaneously advanced or retracted. I prefer the device for operating the jaws just described, as it makes the chuck self-centering, and the use of the two screws leaves the middle of the chuck unobstructed; but any well-known means for advancing and retracting either or both jaws may be used without losing the benefit of the part of my invention relating to the means for shifting the object held in the jaws.

Concentric with the spindle 2, and preferably mounted on the hub $3^a$ of the chuck, is a loose-fitting gear 14. A shaft 15, Figs. 3 and 4, parallel to the spindle 2, is journaled in the jaw 4, and bears at one end a pinion 16, meshing into the gear 14, and at the other end a bevel-gear 17, meshing into another bevel-gear 18 on a shaft 19, the last-named having a worm 20, which meshes with the worm-gear 21. Said worm-gear 21 is cut in the jaw-piece 22, which is revoluble in the socket 23, Fig. 2, of the jaw 4. A screw 24, projecting into an annular groove 25 in the jaw-piece 22, prevents it from dropping out, and a row of balls 26, inserted back of the jaw-piece, receives the end-thrust due to the pressure of the jaws on the piece in the chuck, thereby diminishing friction. The other jaw 5 has a similar jaw-piece 27. The jaw-pieces 22 27 do not ordinarily come in contact with the piece held by them, detachable jaw-faces 28 29 being fitted to them. These detachable faces are changed to suit the shape and size of the object held.

It is obvious from an inspection of Fig. 4 that any change in the position of jaw 4 will change the depth of mesh between gear 14 and pinion 16, so that the jaws, when tightened within limits determined by the length of the gear-teeth, should occupy approximately the same position. This is accomplished by using jaw-faces of thickness varying according to the size of the piece held in the chuck.

The jaw 4 is provided with a spring-actuated dog 30, Figs. 1 and 4, the inner end of which enters notches 31, cut at intervals around the circle of the jaw-piece 22, so that the latter cannot revolve except when the dog is withdrawn. The outer end of the dog 30 projects slightly beyond the jaw 4.

A movable tripping-piece 32, Figs. 4 and 5, slides on the piece 38, affixed to the bed 33 of the lathe. The tripping device is held normally in the position shown in dotted lines in Fig. 4 by the spring 36, also shown in dotted lines. A shaft 37, pivoted in the piece 38 and box 39, (vide Fig. 5,) carries cams or fingers 40 41, the cam 40 working in a recess in the tripping-piece 32, and the cam 41 being in juxtaposition to and operated by contact with one of the handles 35. The screw 42 limits the forward movement of the tripping-piece 32.

Surrounding the gear 14, Figs. 2 and 4, is a band 34, of which the handles 35 are a continuation. The grasping of said handles brings them together and causes the band 34 to act as a brake on the gear 14.

The operation is as follows: When it is desired to shift the piece in the chuck, (which is supposed to be in motion,) the handles 35 are grasped and the tripping-piece is pushed in till it projects in the path of the dog 30, which is thereby withdrawn and the jaw-pieces left free to revolve. The grasp on the handles 35 at the same time causes the band-brake 34 to slack or stop the loose gear 14, which before revolved with the lathe and attached chuck. The pinion 16, meshing with gear 14 and carried around it by the movement of the chuck, will revolve, and through the gearing heretofore described revolve the jaw-piece 22 and the object held between the jaws. The tripping-piece 32, having released the dog, is allowed to fly back out of the way, and the dog springs into the next recess 31 in the circumference of the jaw-piece 22. The position of the recesses 31 is of course fixed with reference to the work to be done.

I claim—

1. The combination, in a chuck, of a rotatable jaw-piece, a loose gear normally rotating with the chuck, gearing connecting the jaw-piece and loose gear, and a brake adapted to check the rotation of the loose gear, substantially as described.

2. The combination, in a chuck, of a rotatable jaw-piece, a loose gear normally rotating with the chuck, gearing connecting the jaw-piece and loose gear, a dog engaging with the rotatable jaw-piece, a movable tripping device adapted to engage with the dog, and a brake adapted to check the rotation of the loose gear, substantially as described.

3. The combination, in a chuck, of a rotatable jaw-piece having a worm-gear attached thereto, a worm-shaft gearing therein, a second shaft journaled parallel to the axis of the chuck and connected to the worm-shaft by bevel-gears, and a loose gear concentric with the chuck meshing with a pinion on the second shaft and provided with a brake for checking its rotation, substantially as described.

4. The combination, in a chuck, of a rotatable jaw-piece, a loose gear normally rotating with the chuck, gearing connecting the jaw-piece and loose gear, a dog engaging with the rotatable jaw-piece, a movable tripping device adapted to engage with the dog, and a brake adapted to check the rotation of the loose gear, the handles for operating the brake, and the cam for operating the tripping device being juxtaposed and arranged to be operated by the grasp of one hand.

5. The combination of a rotatable chuck-jaw, a loose gear concentric with the axis of the chuck, gearing connecting said loose gear to the rotatable jaw, a dog adapted to lock the rotatable jaw, a tripping-piece adapted to release said dog, a brake upon said loose gear extended to form handles, and cams connected to said tripping-piece and operated by contact with said handles, all combined substantially as described.

JAMES T. HAYDEN.

Witnesses:
P. H. T. MASON,
IRWIN VEEDER.